(12) United States Patent
Marks

(10) Patent No.: US 11,406,098 B2
(45) Date of Patent: Aug. 9, 2022

(54) EASY SET TUNNEL FORM ANIMAL TRAP

(71) Applicant: Joel S. Marks, Sherman Oaks, CA (US)

(72) Inventor: Joel S. Marks, Sherman Oaks, CA (US)

(*) Notice: Subject to any disclaimer, the term of this patent is extended or adjusted under 35 U.S.C. 154(b) by 106 days.

(21) Appl. No.: 16/866,157

(22) Filed: May 4, 2020

(65) Prior Publication Data
US 2020/0344996 A1 Nov. 5, 2020

Related U.S. Application Data

(60) Provisional application No. 62/843,452, filed on May 5, 2019.

(51) Int. Cl.
*A01M 23/30* (2006.01)
*A01M 23/24* (2006.01)

(52) U.S. Cl.
CPC .......... *A01M 23/245* (2013.01); *A01M 23/30* (2013.01)

(58) Field of Classification Search
CPC ...... A01M 23/24; A01M 23/26; A01M 23/28; A01M 23/30; A01M 23/245
USPC ........ 43/77, 81, 82, 83, 83.5, 88, 90, 91, 95
See application file for complete search history.

(56) References Cited

U.S. PATENT DOCUMENTS

| 386,009 | A | * | 7/1888 | Heltsley | A01M 23/26 43/95 |
| 434,842 | A | * | 8/1890 | Sowash | A01M 23/26 43/92 |
| 599,407 | A | | 2/1898 | Sullivan | |
| 718,853 | A | | 1/1903 | Merritt | |
| 744,029 | A | | 11/1903 | Birdsall | |

(Continued)

FOREIGN PATENT DOCUMENTS

| EP | 0954964 A1 | * | 11/1999 | ............ A01M 23/30 |
| EP | 0954964 A1 | | 11/1999 | |

(Continued)

OTHER PUBLICATIONS

Wildlife Control Supplies, "Product Instructions for the Wildlife Control Supplies Tube Trap!" Wayback Machine capture available at https://web.archive.org/web/20180407115557/https://www.wildlifecontrolsupplies.com/pdf/Tube_Trap_Instructions.pdf (Year: 2018).*

(Continued)

*Primary Examiner* — Lisa L Tsang
(74) *Attorney, Agent, or Firm* — Rankin, Hill & Clark LLP

(57) ABSTRACT

A strike trap with improved reliability and ease of setting. In a preferred configuration the improved trap is in the form of a tunnel or tube trap. In a preferred embodiment the strike bar moves upward from a low position to strike against an interior wall or equivalent structure of the tube. The strike bar is set by pressing it downward to become automatically latched near a floor or bottom of the tube. With the downward set action a single hand or foot can provide the set motion wherein the ground or other support surface exclusively provides a reaction force. A two stage retention system provides reliable low force, low travel trip action. The strike bar therefore can pivot adjacent to a wall with the bar extending away there from. This compact arrangement ensures the tube entrances in the tube embodiment are adjacent to the wall.

9 Claims, 8 Drawing Sheets

(56) References Cited

U.S. PATENT DOCUMENTS

| | | | |
|---|---|---|---|
| 788,406 A * | 4/1905 | Howe | A01M 23/26 43/92 |
| 882,755 A | 3/1908 | Hamilton | |
| 1,164,916 A | 12/1915 | Brown | |
| 1,248,944 A | 12/1917 | Stilson | |
| 1,462,739 A | 7/1923 | Champlin | |
| 1,464,872 A * | 8/1923 | Heddle | A01M 23/26 43/92 |
| 1,533,589 A * | 4/1925 | Frogge | A01M 23/26 43/88 |
| 1,541,855 A | 6/1925 | Sands | |
| 1,541,856 A | 6/1925 | Sands | |
| 1,665,020 A * | 4/1928 | Winfield | A01M 23/265 43/82 |
| 1,726,127 A * | 8/1929 | Seghersemielp | A01M 23/30 43/97 |
| 1,726,694 A * | 9/1929 | Cooper | A01M 23/24 43/85 |
| 1,747,380 A | 2/1930 | Mccully | |
| 1,799,149 A | 4/1931 | Bumley | |
| 1,831,621 A * | 11/1931 | Cooper | A01M 23/26 43/85 |
| 1,897,151 A * | 2/1933 | Seghers | A01M 23/30 43/81.5 |
| 2,002,095 A | 5/1935 | McCabe | |
| 2,087,440 A | 7/1937 | Merz | |
| 2,215,028 A | 9/1940 | Booth | |
| 2,376,591 A | 5/1945 | Hammond | |
| 2,502,035 A * | 3/1950 | Bruske | A01M 23/26 43/92 |
| 2,502,850 A | 4/1950 | Johnson | |
| 2,616,211 A | 11/1952 | Johnson | |
| 2,636,310 A | 4/1953 | Oakes | |
| 2,684,553 A | 7/1954 | Schroeder | |
| 2,778,149 A | 1/1957 | Edwards | |
| 3,161,984 A * | 12/1964 | Martin | A01M 23/24 43/85 |
| 3,392,478 A * | 7/1968 | Strayline | A01M 23/30 43/81.5 |
| 3,747,259 A * | 7/1973 | Pellowski | A01M 23/26 43/90 |
| 4,297,805 A | 11/1981 | Kness et al. | |
| 4,363,183 A * | 12/1982 | Drdlik | A01M 23/30 43/81 |
| 4,369,595 A | 1/1983 | Kness et al. | |
| 4,425,732 A | 1/1984 | Kania | |
| 4,574,519 A | 3/1986 | Eckebrecht | |
| 4,685,245 A | 8/1987 | LaPier | |
| 4,711,049 A | 12/1987 | Kness | |
| 4,852,294 A | 8/1989 | Langli | |
| 5,172,512 A * | 12/1992 | Bodker | A01M 23/30 43/81 |
| 5,307,587 A | 5/1994 | Zeiger et al. | |
| 5,706,601 A | 1/1998 | Dail | |
| 5,950,354 A | 9/1999 | Carnwath | |
| 6,508,031 B1 | 1/2003 | Johnson et al. | |
| 6,574,912 B1 * | 6/2003 | Johnson | A01M 23/26 43/58 |
| 6,655,077 B1 * | 12/2003 | Trevino | A01M 23/30 43/81 |
| 7,069,688 B2 | 7/2006 | Hill | |
| 7,814,702 B2 | 10/2010 | Nathan et al. | |
| 8,042,299 B1 | 10/2011 | Brown, Jr. | |
| 8,397,426 B2 | 3/2013 | Rodgers et al. | |
| 8,490,323 B2 | 7/2013 | Nathan et al. | |
| 8,913,741 B2 | 12/2014 | Billet et al. | |
| 2008/0236024 A1 | 10/2008 | Ouellette | |

FOREIGN PATENT DOCUMENTS

| | | | | |
|---|---|---|---|---|
| FR | 677421 A | * | 3/1930 | A01M 23/30 |
| GB | 381280 A | | 10/1932 | |
| GB | 657259 A | | 9/1951 | |
| GB | 762248 A | * | 11/1956 | A01M 23/30 |
| GB | 2216764 A | | 10/1989 | |

OTHER PUBLICATIONS

Youtube, Maine Wildlife Management, "Wildlife Control Supplies Squirrel Tube Trap Review," available at https://www.youtube.com/watch?v=kS64iGB_row (Year: 2017).*

Wildlife Control Supplies Tube Trap Instructions; date unknown—admitted prior art.

Wildlife Control Supplies Tube Trap Adjustments; date unknown—admitted prior art.

Video Screen Capture "Setting the WCS Tube Trap" https://www.youtube.com/watch?v=_4VLsNKUwC0; date unknown—admitted prior art.

Video Screen Capture "Setting the WCS Tube Trap-2" https://www.wildlifecontrolsupplies.com/animal/WCSTUBE.html; date unknown—admitted prior art.

* cited by examiner

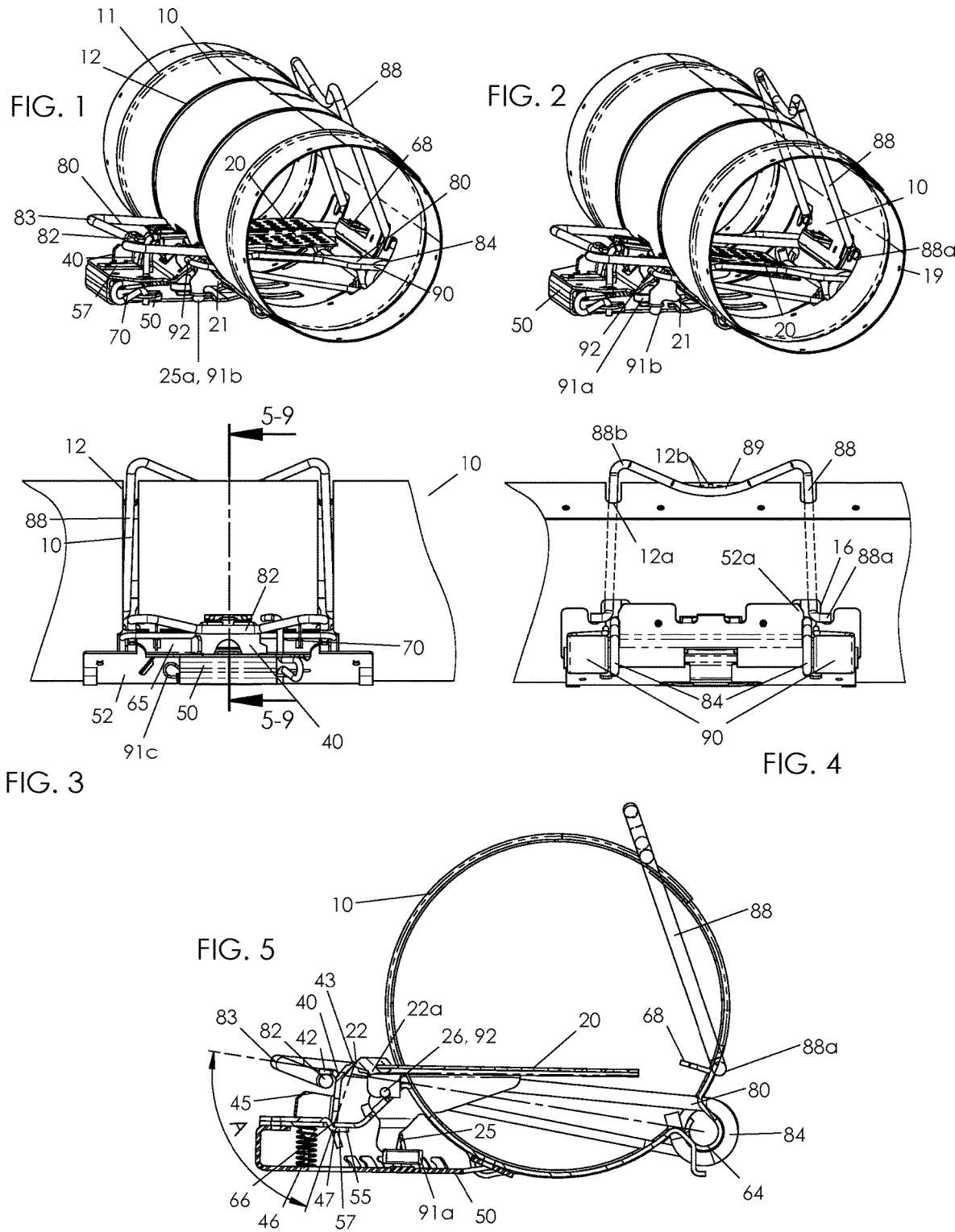

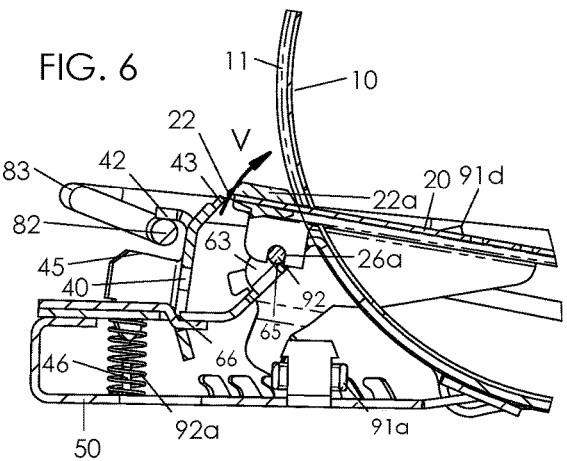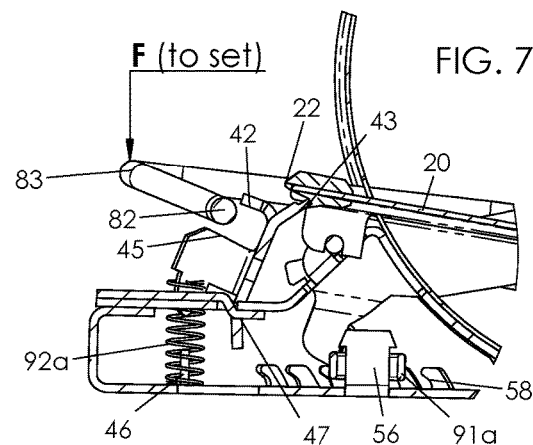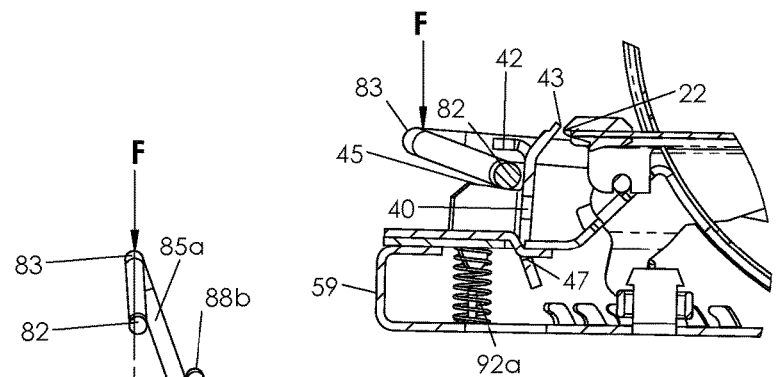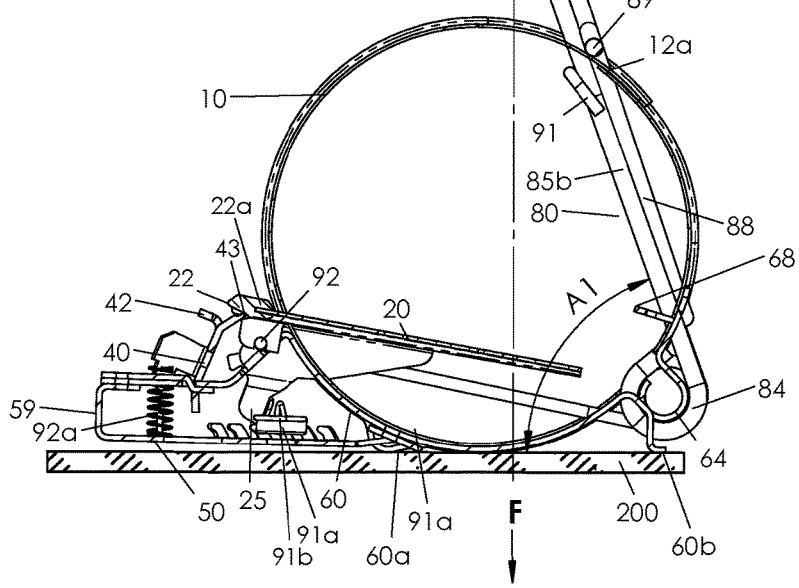

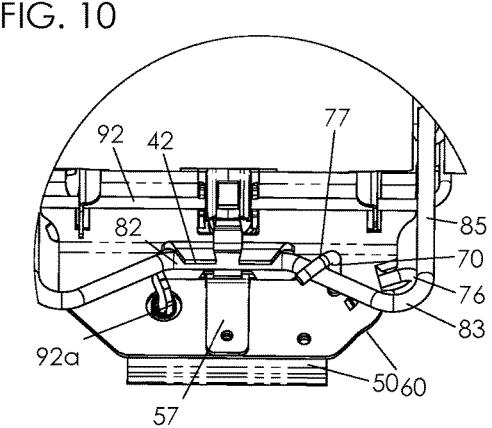
FIG. 10
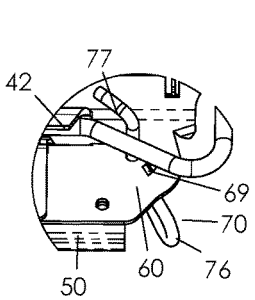
FIG. 10A
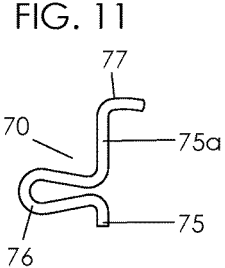
FIG. 11
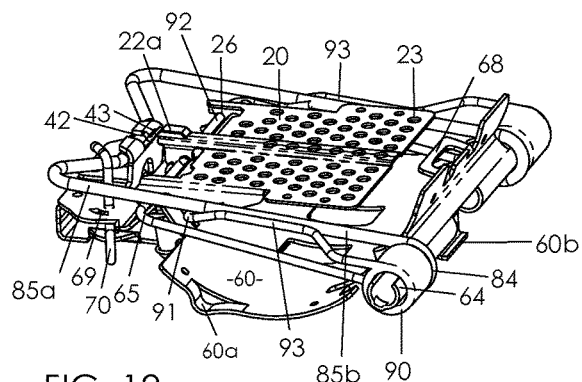
FIG. 12
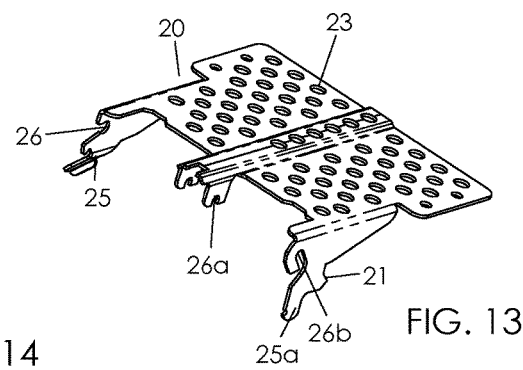
FIG. 13
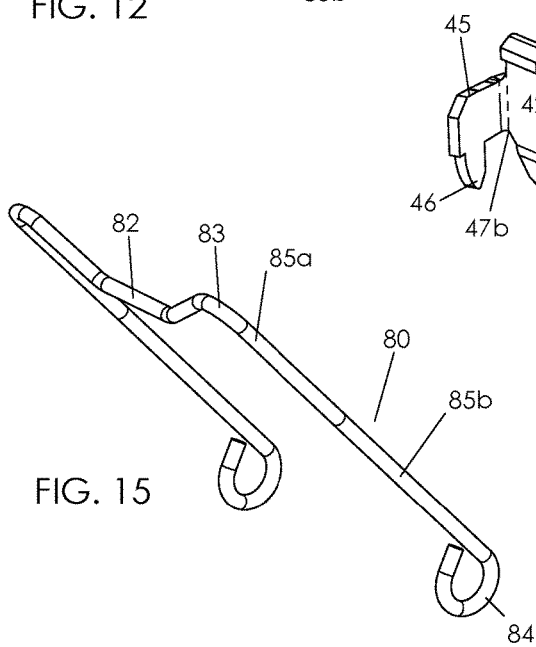
FIG. 14
FIG. 15
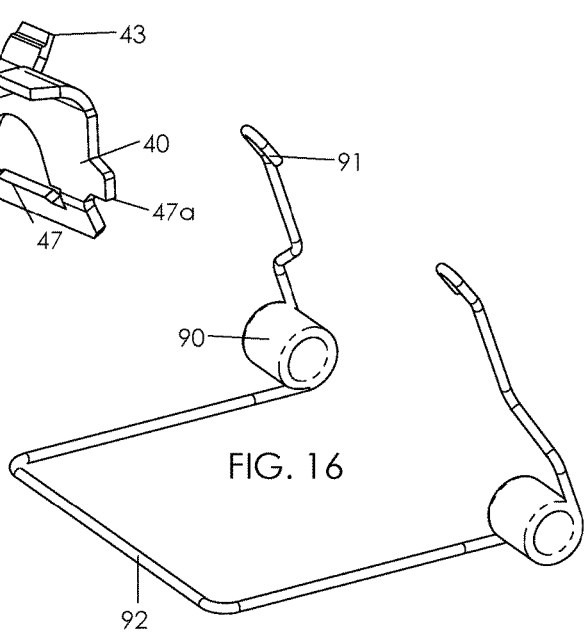
FIG. 16

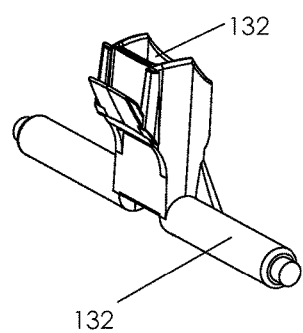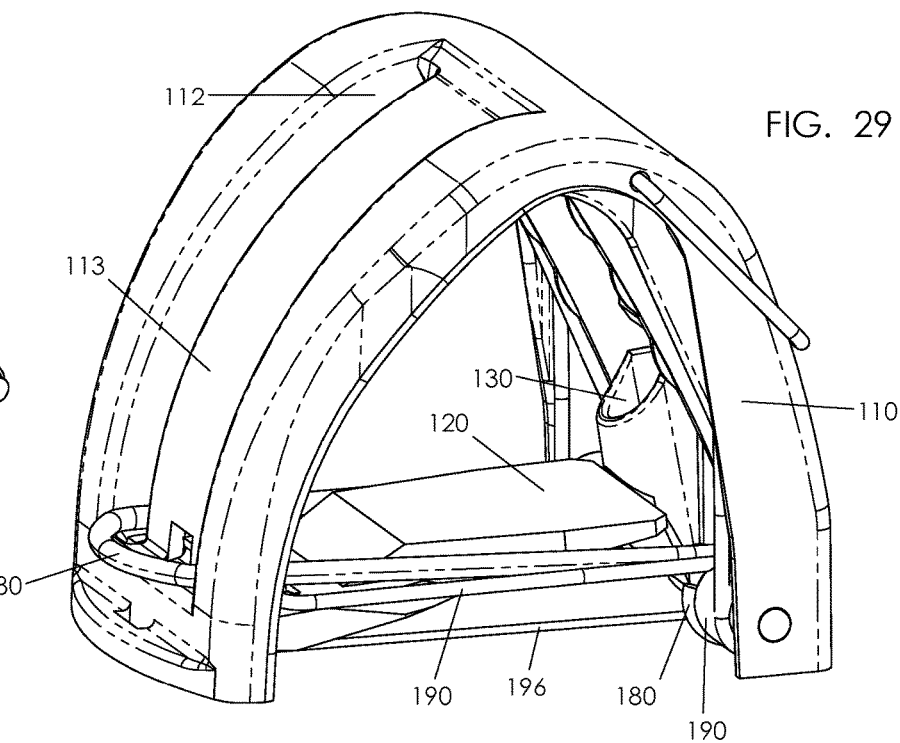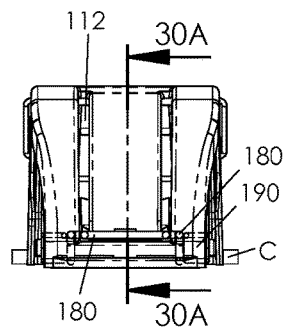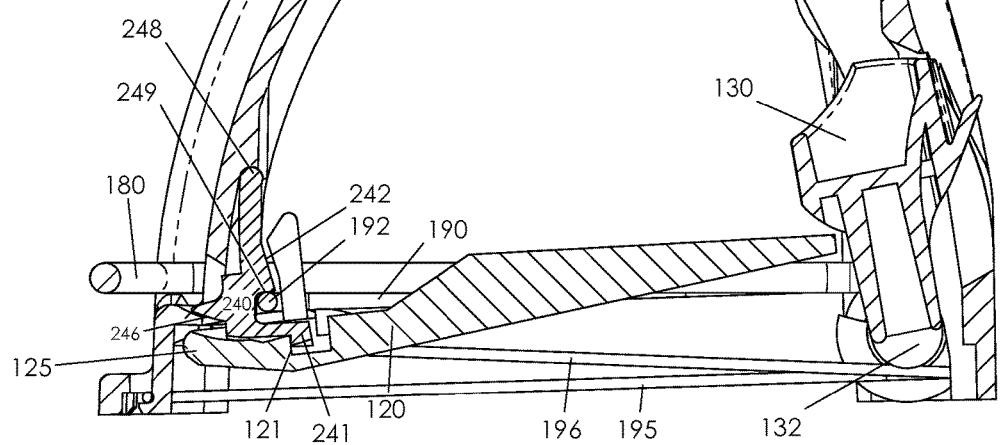

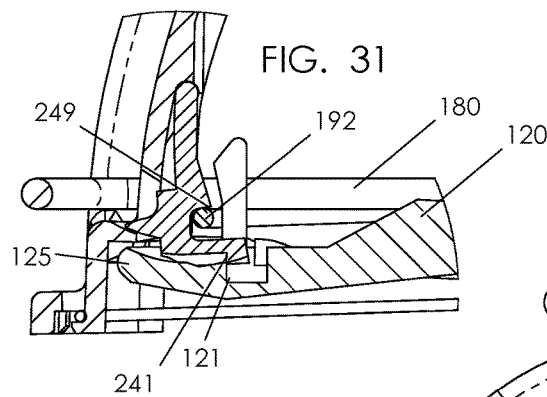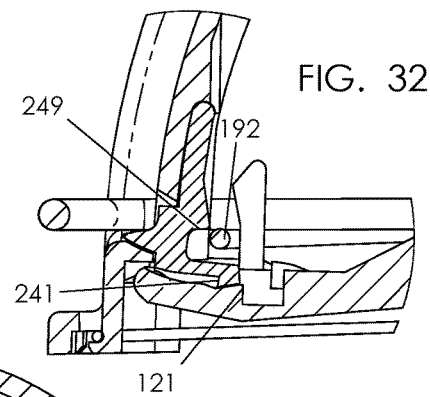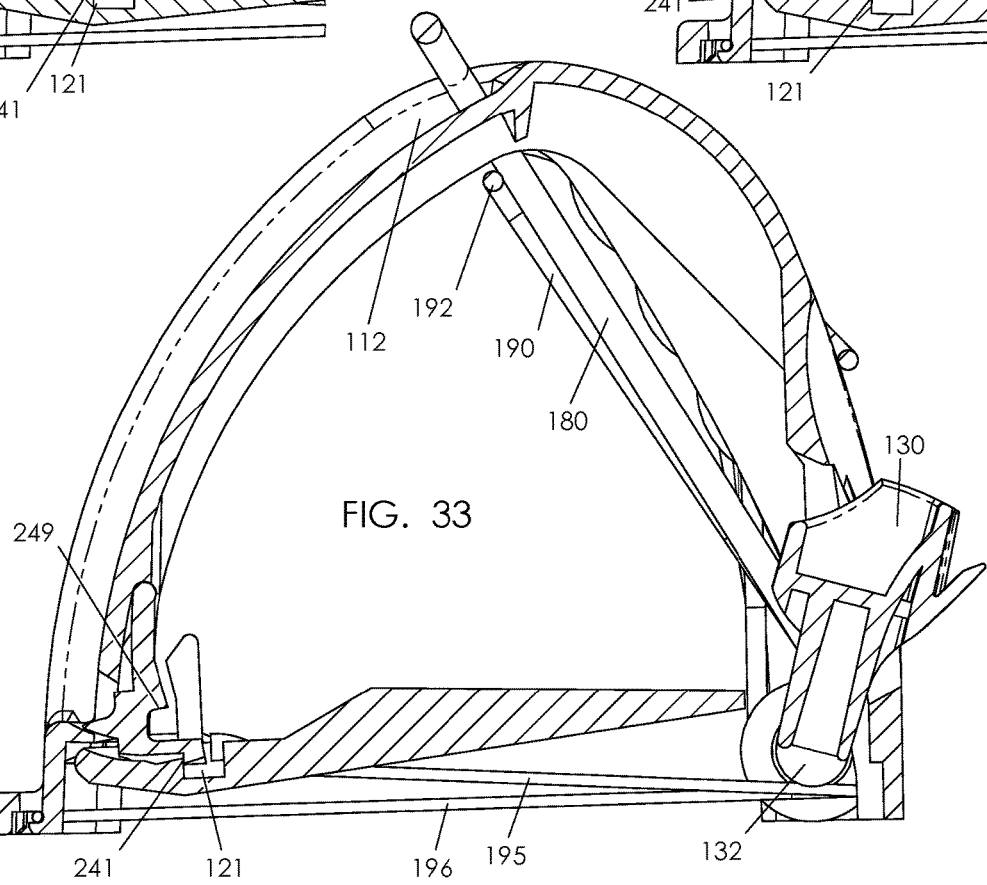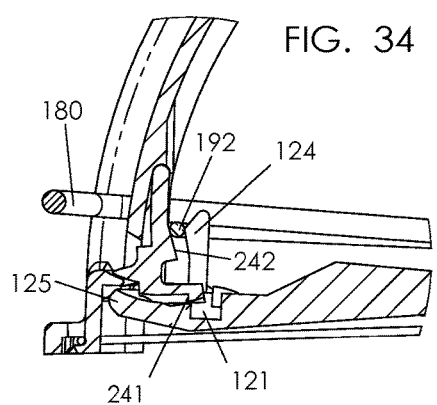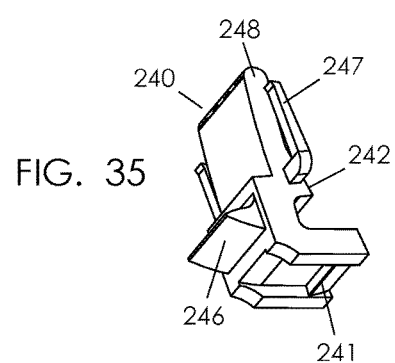

EASY SET TUNNEL FORM ANIMAL TRAP

PRIORITY CLAIM

This application claims priority to U.S. Provisional App. Ser. No. 62/843,452, filed May 5, 2019, which is incorporated by reference in its entirety.

FIELD OF THE INVENTION

The present invention relates to lethal impact kill animal traps. More precisely, the invention relates to improvements in efficiency and ease of use of spring energized tunnel traps.

BACKGROUND

Mechanical lethal traps or "strike traps" typically include a spring energized strike bar or the like to suddenly impact and kill a target animal. The strike bar is moved by an operator against the spring bias to a set position. The animal is enticed by bait or other features of the trap to approach a trip element of the trap that is in range of the strike bar. Moving the trip element releases the strike bar to impact and kill the animal under bias from the spring. One example is the familiar wooden rat or mouse trap. Such traps can be difficult to set, requiring two hands to counteract the upward and sideways forces that result from setting these type of traps. This sort of trap further can be hazardous to house pets or others who may accidentally contact and trip the device. Typical strike traps also leave the victim largely exposed which can be unappealing for users. Some other strike traps use a pivoted lever system wherein a strike bar pivots upward in response to pressing downward on a lever linked to the strike bar opposite the pivot. This system may be operable to set by one hand but such traps require added length behind the pivot to accommodate this lever. Such a trap therefore cannot fit compactly against a wall or the like.

Over twenty years ago, Wildlife Control Supplies of Granby, Conn., began selling a product under the TUBE TRAP™ mark, which is a tubular tunnel-shaped trap powered by a torsion spring. Applicant has provided information regarding the TUBE TRAP™ device in an Information Disclosure Statement submitted with the application. The TUBE TRAP™ device can be used baited or non-baited, and is effective at capturing small animals such as squirrels and other rodents that attempt to run through it or hide in it. Once the animal reaches a triggering pan in the middle of the trap, and steps on it, the torsion spring triggers the strike bar to capture the animal within the trap, generally out of view from the outside of the trap. The present invention provides improvements over prior art traps, including the TUBE TRAP™ device.

SUMMARY OF THE INVENTION

In various preferred embodiments, the present invention is directed to a compact strike trap with improved reliability and ease of setting. In a preferred configuration the improved trap is in the form of a tunnel or tube trap. The tube includes at least one end entrance and optionally two spaced apart entrances at each end with the operative elements at a central region of the tube. Further, in a preferred embodiment the strike bar moves upward from a low position to strike against an interior wall or equivalent structure of the tube. The strike bar is set by pressing it downward to become automatically latched near a bottom of the tube. With the downward set action a single hand or foot can provide the set motion wherein the ground or other support surface provides a reaction force. The downward set strike bar is directly pressed to set without a need for an intervening lever. The strike bar therefore can pivot adjacent to a wall with the bar extending away there from. This compact arrangement ensures the tube can be parallel to a wall and the entrances in the tube embodiment are adjacent to the wall.

The strike bar and a latch cooperate to move in sequence whereby the moving the strike bar toward its set position causes the latch to move to its respective set position to hold the strike bar from moving under the spring bias. A two stage retention system enables low and consistent trip force over a small trip plate travel motion. Preferably a trip plate or pan is located within the tube adjacent to the strike bar, with the trip plate also automatically assuming its set position when the strike bar is moved thereto. With the preferred tube embodiment the kill area is enclosed so that a substantial portion of the victim is not readily visible from outside the trap.

BRIEF DESCRIPTION OF THE DRAWINGS

FIG. 1 is an end perspective view of an embodiment of an easy set tube trap with the trap in a set condition.

FIG. 2 is the view of FIG. 1 with the trip plate pressed.

FIG. 3 is a front elevation view of the trap of FIG. 1 with a section line corresponding to the section views of FIGS. 5 to 9.

FIG. 4 is a rear elevation view of the trap of FIG. 3.

FIG. 5 is a partial section view as indicated by the section line in FIG. 3, with the trap in the set condition.

FIG. 6 is a detail of the partial section view of FIG. 5, with the trip pan or trip tray pressed.

FIG. 7 is the view of FIG. 6 with the trap in a pre release part of a cycle or opposite intermediate set condition of the cycle.

FIG. 8 is the view of FIG. 5 with the trap in a tripped condition.

FIG. 9 is the view of FIG. 7 with the trap in a pre-set condition.

FIG. 10 is a detail front perspective view of the trap in a set and safety locked condition.

FIG. 10A is a cropped view of FIG. 10 with the safety lock in an unlocked position.

FIG. 11 is an elevation view of a safety lock.

FIG. 12 is side rear perspective view of the trap mechanism, or central module, in the set condition.

FIG. 13 is a front perspective view of a trip plate.

FIG. 14 is top front perspective view of a latch.

FIG. 15 is side perspective view of a strike bar.

FIG. 16 is a top perspective view of a power spring.

FIG. 29 is a right side perspective view of an alternate embodiment spring strike trap.

FIG. 29A is a front perspective view of a bait holder/hinge.

FIG. 30 is front elevation view of the trap of FIG. 29.

FIG. 30A is a partial section view of the trap of FIG. 30.

FIG. 31 is a detail view of the trap of FIG. 30A in a pressed condition.

FIG. 32 is the trap of FIG. 31 is a pre-release condition.

FIG. 33 is the trap of FIG. 30A in a released or tripped condition.

FIG. 34 is the trap of FIG. 31 in a pre-set condition.

FIG. 35 is a bottom front perspective view of a latch of the assembly of FIG. 34.

DETAILED DESCRIPTION OF THE PREFERRED EMBODIMENTS

Figure 17:
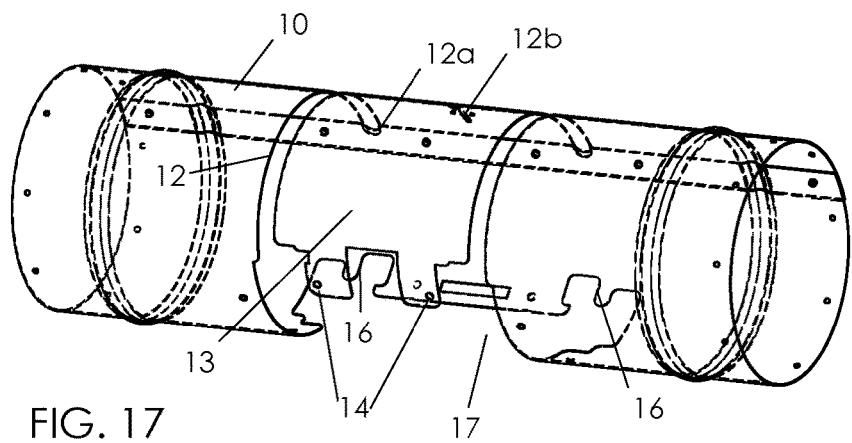
FIG. 17 is a front perspective view of a tube cover or enclosure.

In an animal trap, the operation thereof should be simple, repeatable and secure. However, this has not been the case. The present invention in various preferred embodiments includes improvements to the ease of use, reliability, effectiveness and cost for a lethal strike animal trap.

In a one embodiment the trap includes a central section or module with operative moving parts and a separate cover forming a tube around and beyond the central section. The central section, as seen in FIG. 12, may be a separate module from the tube cover to facilitate assembly and function. In use the trap may be placed in an area the target animal frequents. To entice the animal to enter bait may be placed on trip plate 20, in or on shelf 68, FIGS. 1, 12, or by a screw or clip in slot/holes, 12b, FIG. 4. The animal may also be enticed by the protection offered by the confined space, or by placing the tube at a hole in a structure or tunnel in the ground whereby the animal normally passes through whereby the animal must pass through the tube to access the hole.

FIGS. 1 and 5 shows the trap in a set condition. The drawings are, without limitation, in proportionate scale. Strike bar 80 extends from a rear, or first side, of the trap at pivot 84 to a front distal termination at corner 83a, with the strike bar being cantilevered past a front of the tube. Power spring 90 biases the strike bar upward from its bottom position, see also FIGS. 15 and 16. In the orthogonal drawing views upward is toward the top of the page and downward is toward the bottom of the page. Vertical with respect to the orthogonal illustrated structures is equivalently vertical on the respective drawing page. Latch 40 holds the set position of the strike bar with latch shelf 42 selectively confining crossbar 82 of strike bar 80 at a shelf-strike bar interface. Shelf 42 is angled approximately as shown to be lightly biased to slide rearward, to the right in FIG. 5, against cross bar 82. The latch presses lightly against trip tray cam 22 of trip plate 20, or equivalent trip plate/latch interface or linked element of trip plate 20 from the rearward bias on shelf 42 from the crossbar. The plate/latch interface may equivalently be referred to as a tray/latch interface. The latch, cam 22 and associated elements are parts of a "set mechanism" that enables the strike bar to stay set and to release the strike bar upon motion of the tray. This cooperation provides a two stage retention system of the set mechanism discussed below.

Strike bar 80 is a substantially U shaped wire structure with substantially straight or continuous side arms of the "U" each including a distal end 85a and a proximal end 85b, FIG. 8. The distal end is cantilevered past the enclosure of tube 10 to comprise a "press segment" that includes a portion that is pressed by an operator to move the strike bar downward. The proximal end is within the enclosure and comprises a "kill segment" that impacts the target animal against pinch bar 88 near the rear of tube 10. Pinch bar 88 is aligned with each side arm, FIGS. 4 and 22.

Tray 20 may be equivalently called a trip tray, trip plate or a trip pan, and these terms are used equivalently in this disclosure. The trip plate operates by vertical motion in the confined space of tube 10. It is of particular utility therefore that the trip plate operates through a small motion so that the plate need not occupy an excess portion of the tube diameter for its range of motion. To enable this feature the trip action must be smooth, low friction, and consistent. This reliable function is enabled by the two stage retention structure disclosed.

The structures of cam 22 and release shelf 42, and respective cooperating components form a preferably two stage retention mechanism. Preferably cam 22 is a low friction material such as acetal, being a part of snap in latch slide 22a, FIG. 12. Other low friction materials are contemplated including for example nylon, Teflon, or bronze. In general the low friction interface is a distinctly separate element and material with lower surface friction from either the trip plate or the latch since it is not normally practical to make either of these two parts entirely from such materials. For the latch low friction materials are too weak and for the tray such materials are also too weak or too expensive. Optionally the latch or other mating area may be chrome plated to further reduce friction.

Figure 19:
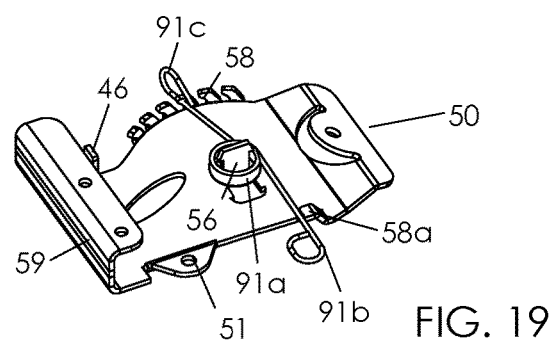
FIG. 19 is a top front perspective view of a reinforcing bottom element.

The first stage trip motion occurs at cam 22 while the release, or disengagement from the strike bar, occurs at shelf 42 of the latch. With latch 40 interposed between high force strike bar 80 and low force cam 22 the high forces are diffused upon trip plate 20. As a result there is minimal friction at the cam 22 interface since the force against latch 40 is low. In particular the friction effects for cam 22 sliding on a face of latch 40 at tab 43 are negligible so that variations in friction here will not substantially affect the trip force of trip plate 20. Such variations are known for example in the surface and plating properties of the parts as well as fit and shape tolerances. Also the environment may have effects; for example oxides that form on zinc plating when set in contact for even a few hours in damp conditions can cause the parts to bind upon first motion there between. As the force by strike bar 80 increases relative to the desired trip force these factors will cause large variance in the actual trip force absent the force isolation of two stage retention. The trip force by a small animal on trip plate 20 should be able to range down to ounces, preferably able to adjust to well below a half pound for example for common rodents. Higher trip forces may be used if desired, for example with an adjustable force system as discussed below. By comparison the strike bar presses upward with 25 to 30 lbs or more in an exemplary embodiment. So it is useful to isolate the high kill force from the low trip force. In fact plate torsion spring 91a, FIG. 19, is a primary factor in providing the trip force of the preferred embodiment of the present invention, with the force of strike bar 80 being secondary. In this way the trip force is always substantially the same and easily controlled simply by selection of or adjustment of spring 91a. In contrast for example, if trip plate 20 were directly fixed to latch 40, the force and friction between shelf 42 and the surface of strike bar 80 would be the primary variable for trip force. Very small variances here will affect the delicate forces desired for trip. In the structures disclosed a two stage retention system is simple, reliable and easy to operate.

Cam 22 is a lateral interface against the latch at a front of the trip plate with a front face at 22 sliding along latch tab 43. Cam 22 displaces at least as much vertically as it does laterally, moving upward and laterally toward tube 10, as noted with the "V" arrow in FIG. 6, whereby latch 40 moves laterally (side direction in the section views) to provide the release action. In FIG. 5 an imaginary line is shown connecting the latch pivot at 66 to the tray-to-latch interface at 22. A second line connects the strike bar front distal termination at corner 83 to the strike bar pivot axis. In the set condition an acute angle "A" between these lines is 80 degrees as shown and preferably greater than about 60 degrees. More generally the first stage of the retention mechanism release action, at an interface between the tray and the latch, occurs in a substantially vertical plane represented by the largely vertical imaginary line or equivalent while the second stage, between the latch and strike bar, occurs in a lateral direction. This arrangement allows the set and release system to fit in a compact space between the strike bar and the exterior of the tube. In particular these functional elements are clear of the setting force location at "F" in FIG. 7. In the embodiment of FIG. 20A, this clearance is especially evident. The elements of the two stage operation are clear of an operator's hand or foot when force F (FIG. 7) is applied near the distal end 85a of the strike bar at corner 83 or equivalent ending structure.

FIG. 19 shows tray bias spring 91a mounted to bottom element 50 on coil fulcrum 56. The rotation axis of the coil is preferably vertical as shown whereby the spring and its extended arms lie flat and out of the way along the bottom of the trap assembly. Distal end 91b fits to tray lever 25a, FIG. 1 to bias tray 20 upward. Tray lever 25a extends downward toward the bottom of the trap. Proximal end 91c engages one of spaced apart teeth 58 or equivalent structures to select a pre load torque upon the tray bias spring. In this manner the trip force for the tray is adjustable by selecting a tooth of the base or equivalent structure attached to tube 10 to determine a preload on the torsion spring coil. Tab 58a provides a pre-assembly positioning for the spring to hold the spring distal end near its final position before bottom element 50 is assembled to base 60.

A single stage trip system is an option. For example trip plate 20 and latch 40 could be tied rigidly together while the latch pivots about pivot 47. A cam atop shelf 42 would guide the latch to re-set to the right as crossbar 82 passed downward. If the friction between shelf 42 and crossbar 82 is controlled well, the trip force may be repeatable.

In the set trap condition using the preferred two stage system shown an animal enters the tube and steps on trip plate 20 to cause the plate to rotate downward to the pressed position of FIGS. 2 and 6. Trip plate 20 rotates about hinge 92. This hinge may be an element of power spring 90, as best seen in FIG. 12 and discussed later. Screws or rivets may hold base 60 to tube 10 and also may extend into the enclosure to provide an upper stop limit for trip plate 20. Modified structures are discussed below regarding FIGS. 20-26.

In FIG. 6 cam 22 has moved upward to clear tab 43 and no longer press the latch face. Latch 40 immediately rotates clockwise in FIG. 7 about pivot 47 whereby the trap assumes a pre-release condition of FIG. 7. Note FIG. 7 shows equivalent component positions for separate parts of a cycle; both pre-release and for the opposed action having applied force F to set the trap, discussed below. So the trap assumes the condition of FIG. 7 twice through a full operating cycle sequence. Strike bar 80, at cross bar 82, is now free to instantly rotate within slots 12, FIG. 1, under the bias of power spring 90 to the tripped condition of FIG. 8. Latch bias spring 92a holds the latch in its tripped position to stay disengaged from trip tray cam 22. The latch in this position keeps plate 20 in its down position, FIG. 7. Latch 40 thus stays out of the way of cross bar 82 during the setting step of FIG. 7. Latch post 46 is a guide for latch bias spring 92a.

To re-set the trap, strike bar 80 is pressed downward to pass through the condition shown in FIG. 7 under urging of force F toward its lowest position of FIG. 9. In the intermediate component positions of FIG. 7 latch 40 remains pivoted rearward as shown under bias of latch spring 92a. Cross bar 82 moves downward in front of shelf 42 become below the shelf. With continued motion under bias of force F crossbar 82, or other element connected to strike bar 80, presses edge 45 of latch 40, FIG. 9. In a cam action at edge 45 the latch rotates against the light bias of latch spring 92a from the position of FIG. 7 to that of FIG. 9. Tab 43 has moved from out under cam 22 and trip plate 20 can rotate upward under bias of plate or tray spring 91a; compare FIGS. 7 and 9. Latch 40 is then held in its set position. Shelf 42 is a first arm of the latch, while edge 45 is part of a second arm of the latch.

According to one embodiment the tube is about 15 inches long, 4.5 inches wide, and force F at the positions shown is about 25 to 30 lbs. These parameters are suited for example for catching squirrels and creatures of similar size. Other sizes and forces are contemplated, for example about 5-10 lbs and 3.5 inch diameter for rats. The respective elements are scaled accordingly.

As described above the set operation is automatic whereby action and contact on a single element of the trap causes that element and respective linked elements to move from a tripped condition to a set condition. As seen in FIG. 8 strike bar 80 pivots about formed post or hinge 64 of base 60, see also FIG. 18. Corner 83 forms a distal end of strike bar 80. This pivot axis is along the rear of the tube, the right side in the view of FIG. 5. The set mechanism is in front opposite the pivot axis external to the tube enclosure, to the left of the tube in FIG. 5. The axis is parallel to the length of tube 10. Bottom element 50 or other downward extensions of the assembly support the trap on ground 200 or other suitable horizontal surface, FIG. 8. In FIG. 8 there are extensions 60a and 60b from base 60 to provide a tripod support for the trap, see also FIG. 12, wherein the front bottom of base 60 does not necessarily rest on the ground. In this case the trap has a normal rest position on the ground as in FIG. 8 while it may rock about extension 60a until the base makes ground contact as the strike bar is pressed down. With supports 60a and 60b relatively close together in FIG. 8 the trap may be stable resting on top of a block wall for example where face 59 may extend past the wall. It will be noted that the trap may also be attached to vertical features such as a tree trunk, fence or the like using holes 19, FIG. 2, for example even as it is normally suited for use on the ground. In most cases the trap would be set on the actual ground so that the trap moves or tilts, if required, from the position of FIG. 9 until front of base 60 at 59 makes ground contact to react to the force F.

Strike bar 80 forms a less than 90 degree angle relative to the ground, to facilitate pressing the strike bar downward. Force F aligns forward of ground support 60b. Angle A1 is 70 degrees in FIG. 8, as shown before the pressing operation begins, with a range of 60 to 80 being preferable. With this angle it is possible to set the trap downward by pressing with a single hand or foot toward ground 200. Specifically the strike bar can be practically or normally moved by vertical force F against the bias of power spring 90 through its full possible motion from tripped to set by pressing exclusively on the distal end of the strike bar toward the ground. The ground provides the entire reaction force to force F. This contrasts with prior tube traps where moving the strike bar from the tripped position by a vertical or forward biased force F is not practical except by grasping the enclosure or other part of the trap to immobilize the device.

With respect to structure corner 83 is forward of an axis of hinge 64 in FIG. 8. Also the trap with the described strike bar angle or equivalent may be set with a foot, preferably by the inside edge length of the foot to provide for pressing both corners 83. At force F of 25 to 30 lbs, pressing by a foot may be convenient, using the operator's weight rather than hand strength. This method also may help low strength users operate the trap. In FIGS. 9 and 10 corner 83 forms a distal end of strike bar 80 while crossbar 82 is inward (to the right in FIG. 9) in the view. Further corner 83 is higher than the crossbar portion, by at least the diameter of the wire of the strike bar in FIG. 5. This structure isolates corner 83 from the strike bar area engaged to latch 40. When setting with force F, either with a hand foot or other object, the hand/foot etc will not interfere with the action of the latch. See FIG. 20A for a further isolated set mechanism, discussed below.

To counteract the downward force of strike bar corner 83 the support structure comprising one or both base 60 and bottom element 50 below the strike bar should extend at least as far to the left in FIG. 9 as corner 83. Face 59 of bottom element 50, or more precisely the bottom thereof, describes the distal limit of this support structure; as shown face 59 extends slightly past corner 83 whereby the trap will not tip counterclockwise more than the possible tilt discussed above from force F. As also seen in FIG. 9 strike bar 80 is in its lowest operative position with corner 83 being above or rearward of this distal limit.

Figure 18:
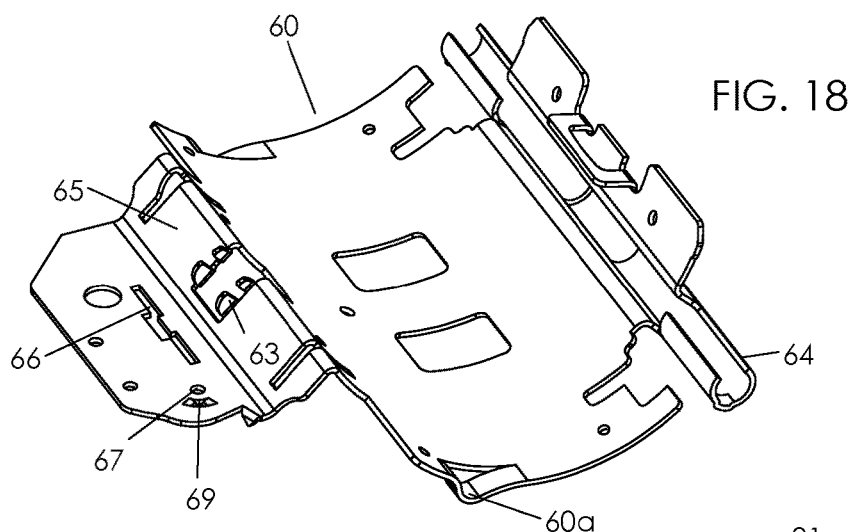
FIG. 18 is a top front perspective view of a base element.

In FIG. 12 power spring 90 is visible in the assembly. The illustrated power spring is a double torsion type with coils at a rear supported on hinge post 64 of base 60 or equivalent structure. Arms 93 terminate in hooks 91 to bias strike bar 80 upward. Connecting segment 92 is supported on elements of base 60. In FIGS. 6 and 18 tab 63 and wall 65 form a notch to support and position segment 92. This sturdy structure accurately locates segment 92 in a second function to serve as a small diameter pivot hinge for trip plate 20. Such accurate location is desired so that cam 22 maintains a repeatable action against latch 40. Since latch 40 is also held by base 60 at slot 66 both the trip plate pivots and latch pivot are keyed to the base. Being small diameter and of strong spring wire, the hinge of segment 92 is low friction and thereby does not add significant friction to the trip action.

Trip plate 20 is preferably assembled in a simple snap action about spring segment 92. Relevant features are seen in FIG. 13. Notches 26, 26a and 26b form the pivot features. With the power spring assembled to base 60 as in FIG. 12, with the exception that the strike bar would not normally be set, the trip plate is assembled to segment 92 with respective notches 26, 26a, and 26b aligned along the spring wire segment. Notch 26a thus holds the plate in the lateral direction, left-right in FIG. 6 while notches 26 stabilize the plate. Tab 21 provides a stop limit for the upper plate position, FIG. 1. Release tab 25, FIGS. 5, 13, provides a convenient way to un-set the trap. An operator would press down on strike bar corners 83 to unload latch 40 and pull tab 25 to the left on FIG. 5. Then the strike bar can be slowly released to the upper position of FIG. 8. Tab 25 is out of the way of the latch, strike bar and related elements, being outside of and/or below these structures, so it is safe to have a finger there.

Pinch bar 88 limits the upper most position of the strike bar and ensures a near zero space for a quick and reliable kill, FIG. 8. The pinch bar also provides a sturdy stop structure to avoid damage to tube 10 at termination 12a of slots 12, FIG. 4, in the event of a dry fire. The pinch bar extends upward past the tube body to also protect the strike bar from becoming bent as the strike bar suddenly stops. In FIG. 8 this extension is between edge 12a and corner 88b, the distance between these structures being at least about ¼ that of a distance between edge 12a and strike bar corner 83. A bending fulcrum is thus higher on the strike bar than a wall of tube 10 (at 88b rather than 12a) so that the strike bar is well supported against bending at its upper motion limit. The pinch bar is held in position by contact at slot terminations 12a, face 89 against tube 10, and tabs 88a at bottom, FIG. 4. It is installed by squeezing the lower legs together to clear edge 16 of tube 10. Releasing the legs puts tabs 88a against a face of the tube. Installing bottom element 50 with the center module locks the pinch bar in place at edge 52a.

Hold latch 70 provides a means to secure strike bar 80 in the set position for safety or convenience when transporting or doing other actions on the trap. The hold latch is guided in the base by collinear portions 75 and 75a, FIG. 11. With latch tab 77 engaged as in FIG. 10 the strike bar will stay in place even if trip plate 20 is pressed. FIG. 10A shows a stowed position of the hold latch with tab 77 clear of the strike bar. Detent 69, FIG. 12, selectively keeps hold latch 70 stable in the stowed position so that it will not interfere with the trap setting step. In use the hold latch clicks past detent 69 into the stable operative position of FIG. 10. Lever 76 is pressed or pulled to move the hold latch. As with release tab 25, lever 76 is operable beside or below strike bar 80 and thereby can be operated without risk of contact or impact with the strike bar. As shown lever 76 is accessible beside the strike bar, being about vertically aligned with side bar 85 of strike bar 80. This is useful for example if the trap is set before it is moved into position. The hold latch can be engaged while the trap is moved and then stowed while spring 90 remains energized. Also when an animal is caught in the trap with the strike bar in its upper position, it is required to hold the strike bar down to dispose the animal. The hold latch is easily activated to hold the strike bar down to safely dispose the animal.

The trap is assembled in a modular fashion. Power spring 90 and strike bar 80 are spread and fitted about hinge post 64 of base 60, FIG. 18. Spring segment 92 is placed in the base structures discussed above. Latch 40 is placed in slot 66, FIGS. 5 and 18. Bottom element 50 is moved into position and latch retainer 57 is fitted to confine pivot edge 47 with respect to upward forces from strike bar 80, FIG. 5. Shoulder 47a provides a pivot surface against downward forces as the trap is set. The central module now looks as in FIG. 12. Tube 10 has large opening 17 to enable the modular assembly of FIG. 12 to enter, such entry being to the left relative to tube 10 in the view of FIG. 1. The center module is similar to a cartridge with respect to being installed into a receiving slot of tube 10. Normally hold latch 70 is engaged during this installation to ensure the strike bar remains safely down. With the structure described here the center module may be installed into various lengths or styles of tubes with the center module remaining substantially common between the versions.

Various fastening means known in the art may be used to attach tube 10 to the assembly, including welds, spot welds, rivets, screws, adhesive and other known means. Portion 13 of tube 10, FIG. 17, is preferably cantilevered from the rear at slot ends 12a to accommodate opening 17. Portion 13 is attached at holes 14 to base 60 to support the free end of portion 13 and hold the tube rigid and sturdy in all areas.

Figure 21:
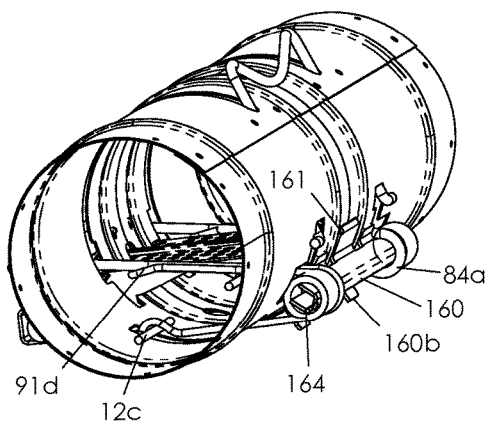
FIG. 21 is a right end perspective view of the trap of FIG. 20.
Figure 22:
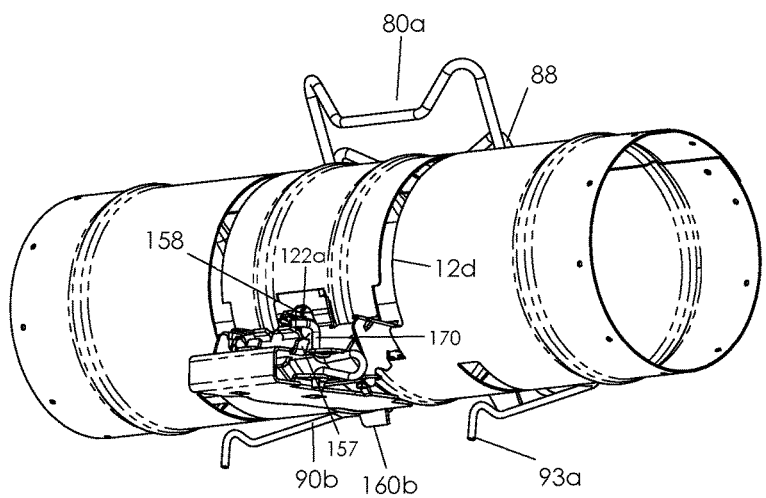
FIG. 22 is a front bottom perspective view of the trap of FIG. 20 in a pre-assembly condition.
Figure 23:
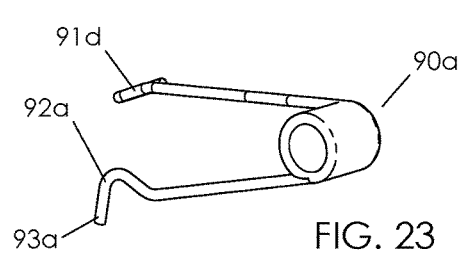
FIG. 23 is a rear perspective view of a right side power spring.
Figure 24:
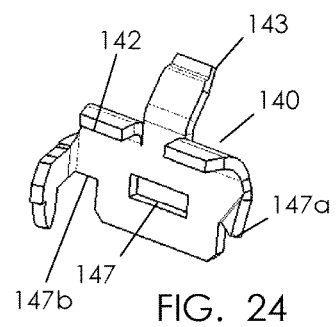
FIG. 24 is a top front perspective view of a modified latch.

FIGS. 20 to 27 show a modified embodiment of the trap. In the modified embodiment tube 10a is relatively continuous with no cantilevered elements. Bottom element 50 is omitted. Spring 90a is mounted to spring hinge bar 160. In the present embodiment the spring element comprises two separate torsion springs; a right side spring is shown in FIG. 23, while an equivalent but opposed spring 90b is partly seen in FIG. 22.

During assembly spring hinge 160 is positioned away from the rear of the tube. Strike bar 80a is inserted from the front through slots 12a and spread about posts 164. Rear openings in tube 10a are wide enough to allow this spreading action. Then each of springs 90a and 90b are placed over the posts and hooked to the strike bar at 91d in the case of spring 90a. The other end of each spring at hook 93a is left loose and unloaded. Base 150 is installed to the tube and tray 120 is installed from within the tube through opening 17a. Tabs 154a and 154b, along with edge 154, cooperate as a hinge for the tray in corresponding openings 126, 128 and notch 127, FIG. 28.

Figure 28:
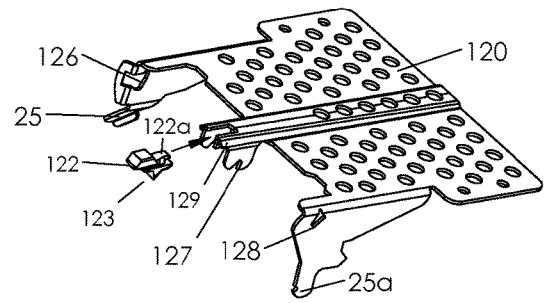
FIG. 28 is a top right perspective view of a modified tray.

With the tray in position on the hinge elements latch slide 123 locks the tray in place at the hinge of edge 154, FIG. 20A. In FIG. 28 the slide is shown moving into position on tray 120. FIG. 20A shows the operative position. Guide face 122a is concentric with the tray pivot location and moves closely but spaced under tab 158, with such spacing being able to hold respective hinge pivot elements 127 and 154 in operative position without binding. Using guide face 122a saves assembly steps and components compared for example to using a separate pivot axle.

Figure 27:
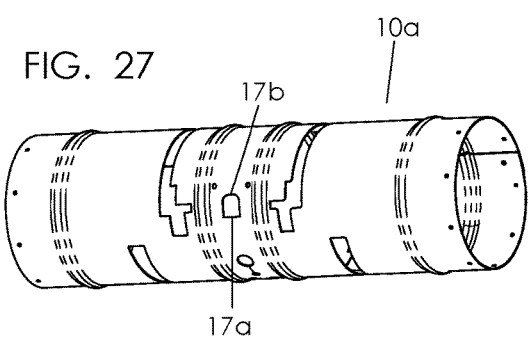
FIG. 27 is a front perspective view of a modified tube cover or enclosure.

Tray extension 129 passes through an aperture in tube 10A, the aperture having a top at 17b and a bottom at 17a in FIG. 27. In the assembly tab 158 extends downward into the aperture to form a functional upper part of the aperture. In FIG. 20A spring 91a biases tray or plate 120 in the direction of D2. This causes the tray to pivot at 127 and trip tray cam 122 at the end of extension 129 to be biased, D1, by the tray spring to move away from the enclosure of tube 10A. Cam 122 of the tray/latch interface moves away from an exterior of tube 10 as tray 120 rises. This geometry ensures that tab 158 remains adjacent and above guide face 122a for the pressed and set positions of the tray. In FIG. 20B the opposite motion bias toward tube 10A, D3, is caused by pressing tray 120 down against the tray bias spring as shown in the pre-release condition.

FIG. 22 shows the assembly with the springs unloaded. To load the spring hook 93a is pressed for example against a table top. Spring retainer 12c, FIGS. 20A and 21, is installed and the hook released to press the retainer. The retainer is preferably a simple straight wire segment. The spring also may be directly hooked through an opening or tab of the tube wall. Since each spring is pre-loaded separately it requires half the force to pre-load compared to a double torsion spring. Further all of the other required assembly steps can be completed before there is stress in the system from the pre-loaded springs.

Latch 140 is pivotally held in the base against upward forces at edge 147 and downward forces at edges 147a and 147b. Release shelf 142 is about equidistant from the latch lower pivot mountings and tray release edge 143. Therefore the lateral bias force to the right at shelf 142 caused by strike bar 80a, FIG. 20A, is halved at latch slide 123 through this leveraging mechanism. Cam 122 moves primarily upward against release edge 143. A lower force at the latch slide reduces friction forces and thus further ensures that tray bias spring 91a primarily determines the trip force on the tray for a repeatable action.

Figure 20:
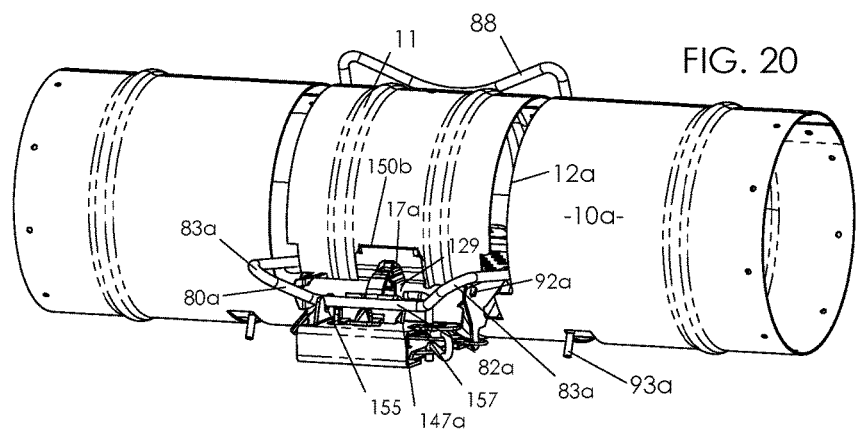
FIG. 20 is a front perspective view of a modified embodiment tube trap in a set condition.
Figure 20A:
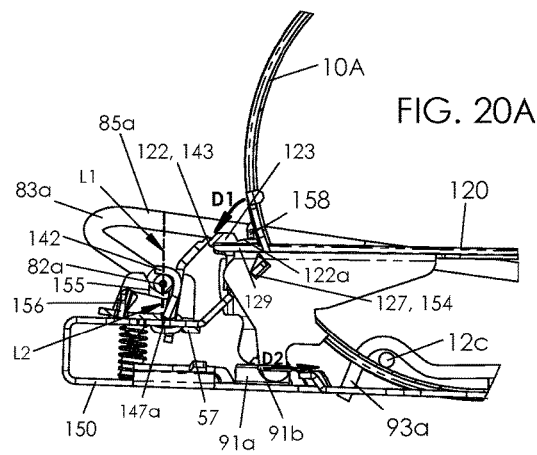
FIG. 20A is a cropped partial section view of the trap of FIG. 20.
Figure 20B:
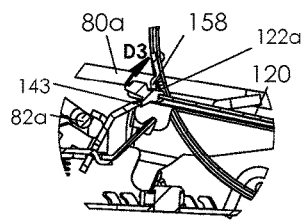
FIG. 20B is a detail of the view of FIG. 20A in a pre-release condition.

Cross bar 82a, FIGS. 20 and 20A, is spaced well below strike bar corners 83a that are to each side of the cross bar. As shown cross bar 82a is vertically closer to latch pivot 147a than to the top of the strike bar distal end 85a. Specifically vertical distance L1 is greater than L2, this ratio being about 2.0 as shown. As discussed above the trap may be set by pressing by foot at or near to corner 83a. In the modified structure shown here latch shelf 142 is further below the strike bar corner to ensure the force application area, 85a, is well clear of the latch action.

Figure 26:
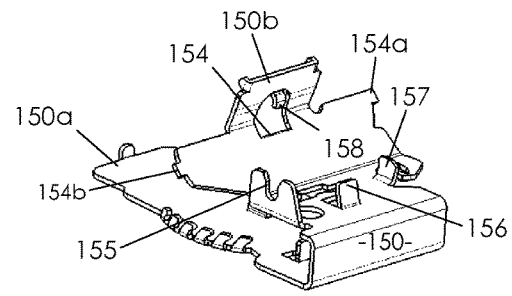
FIG. 26 is a left front perspective view of a modified base component.

The modified assembly includes slot 155, FIG. 26, to provide a repeatable lateral position (with respect to FIG. 20A) for the strike bar. In this manner the latch is pivoted at a location immediately adjacent to the slot and there is minimal dimensional tolerance from intervening components. The action of latch is thus reliable and consistent with minimal pivoting required for its function.

Figure 25:
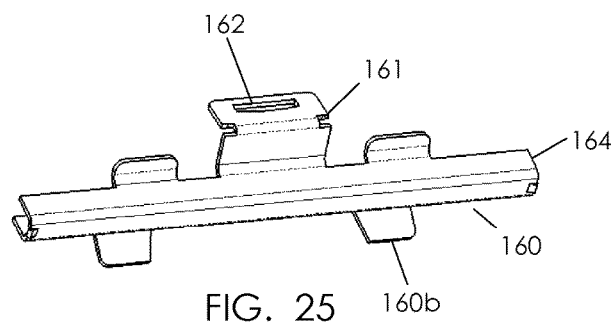
FIG. 25 is a rear perspective view of a spring hinge component.

Spring hinge bar 160, FIG. 25, may include notches 161. These fit corresponding slots in the tube body to fix the hinge to the tube body. This engagement can reduce the need for spot welds or other fastening operations. Slot 162 optionally provides a location to place bait. An equivalent structure 68 is seen in FIG. 8. The hinge bar further optionally includes feet 160b. Combined with spring tip 93a, FIG. 20, there are four feet on which the trap can stand.

FIG. 26 shows a pre-installed condition of base 150. Tab 157 is bent upward to enable installing hold latch 170. It is then bent down, compare FIG. 22 and FIG. 20. Similarly tab 156 may provide a bendable fastening structure to hold latch holder 57, FIG. 20A. Base 150 includes tube mounting locations 150a and 150b with optional locator tabs as shown.

FIGS. 29 to 33 show an alternate embodiment spring strike trap with a two stage retention mechanism. It may operate alone as shown or as a central module within a tube structure as discussed above. This embodiment is well suited for fabrication from plastic materials. A housing 110 pivotally supports trip plate 120, strike bar 180 and power spring 190. In FIG. 30A latch 240 is pivotally held to the housing at pivot 248. Cam 246 holds the pivot in position. Shelf 249 of the latch holds power spring 190 down in the set condition at spring segment 192. Shelf 249 is angled to provide a light but reliable bias to rotate the latch clockwise in the view. Latch 240 is held from such rotation at tab 241 against recess 121 of trip plate 120. In FIG. 31 the trip plate is pressed, for example by a light weight animal seeking bait in bait holder 130. The tray rotates about hinge 125. Recess 121 moves down to disengage tab 241. Latch 240 is free to rotate clockwise to the pre-release position of FIG. 32. Shelf 249 is clear from spring segment 192. Next, in FIG. 33, spring 190 forces strike bar 180 up to its tripped position at the top of slot 112. Tab 241 may partly re-engage recess 121 as trip plate 120 moves up.

In the re-set cycle of FIG. 34 spring segment 192 briefly presses guide cam 124 or equivalent structure to briefly move the trip plate down from its previous position of FIG. 33 to clear tab 241 from recess 121. With recess 121 moved down clear of tab 241 in FIG. 34 latch 240 can then rotate clockwise in the view as spring segment 192 slides along latch cam 242. Upon pressing strike bar 180 down the trap resumes the set condition of FIGS. 29 and 30A while tray spring 195 or equivalent bias spring moves the tray up to the set position.

Wire 196 reinforces housing 110 to hold the housing rigid in the case as illustrated that there is no integral bottom structure to the housing. The housing may optionally include a horizontal connector instead as part of its molded or formed structure. In particular the connector may be outside of the enclosure, "C" in FIG. 30, whereby the connector is spaced from strike bar 180 at least by the coil of power spring 190. This spacing facilitates molding the housing without mold undercuts.

Bait holder 130 pivots about base 132 to allow for placing bait within, FIG. 29A. It combines the bait holding function with that of a hinge for strike bar 180 and spring 190. It is seen open in FIG. 33. This feature facilitates access for example if the trap is directed to mice wherein the housing side openings may be 2 just inches wide or less and access to the center of the device is tight. In the case of a model for rats, the openings may be about 3½ inches wide, where a bait holder is still of utility.

As seen in FIG. 29, strike bar 180 is the only moving element exposed external to the housing. The other operative parts are within the housing behind wall 113. This design provides a clean appearance that is inviting to use. When the present trap structure is a central module of a tube the overall appearance is particularly clean and simple. This can be an important advantage for home users of small traps aimed at rats and mice.

The two stage retention in the present embodiment operates with latch 240 interposed between the low trip pressure at recess 121 and the high force of power spring 190 against latch shelf 249. Latch 240 may be made from acetal resin or other low surface friction component. Its low friction qualities within the two stage retention system disclosed allows for a reliable and consistent trip force measured in tens of grams or less, well suited for tripping by small rodents. This system has been demonstrated in a working model.

While the particular forms of the invention have been illustrated and described, it will be apparent that various modifications can be made without departing from the spirit and scope of the invention. It is contemplated that elements from one embodiment may be combined or substituted with elements from another embodiment.

The invention claimed is:

1. An impact kill animal trap comprising:
   an elongated enclosure with an opening at least at one end including a top, a bottom, a front, and a rear, the opening being configured to form an entrance for an animal;
   a strike bar pivotable at the rear of the enclosure about a pivot axis, the pivot axis being parallel to an elongate axis of the enclosure, a power spring biasing the strike bar to rotate about the pivot axis, the strike bar including two side arms, each of said side arms extending continuously from a proximal end within the enclosure to a distal end beyond the enclosure;
   a set mechanism at the front of the enclosure, the set mechanism being configured to selectively hold the strike bar in a bottom set position against a bias from the power spring, the strike bar in the bottom set position extending past the front of the enclosure to the strike bar distal end of the side arms;
   a trip tray pivotably attached to the enclosure at a trip tray pivot at the front of the enclosure, the trip tray including an upper set position and a lower tripped position within the enclosure, the trip tray being biased by a tray bias spring toward the upper set position;
   a release latch of the set mechanism selectively linked to the trip tray and to a cross bar of the strike bar such that movement of the trip tray from the upper set position to the lower tripped position causes the release latch to move and disengage from the strike bar, allowing the strike bar to move from the bottom set position toward the rear of the enclosure, the strike bar moving to an uppermost tripped position under the bias of the power spring; and
   a base forming a support structure mounted near the bottom of the enclosure, the support structure extending outward beyond the front of the enclosure, the support structure being vertically aligned with the strike bar distal end in the bottom set position of the strike bar;
   wherein the release latch includes a proximal end pivotably attached to the base at a release latch pivot, and in the upper set position of the trip tray, a tray release edge of the release latch is slidably engaged with a trip tray cam of the trip tray, the release latch is biased by both of a latch bias spring and the power spring to press the trip tray at the trip tray cam, and the trip tray is separately biased by the trip tray bias spring to hold the trip tray in a position at the trip tray release edge of the release latch,
   wherein in the tripped position, the trip tray release edge of the release latch is biased by the latch bias spring to remain disengaged from the trip tray cam, and
   wherein the trip tray cam is outside of the enclosure and biased by the trip tray bias spring to move away from the front of the enclosure.

2. The impact kill animal trap of claim 1, wherein the trip tray includes an extension, the extension passes through an aperture in the front of the enclosure, and the trip tray cam is attached to the extension.

3. The impact kill animal trap of claim 2, wherein the trip tray cam is of part of a distinctly separate element from the trip tray, and the separate element comprises a different material having lower surface friction than a material of the release latch or the trip tray.

4. The impact kill animal trap of claim 2, wherein the extension includes a guide face spaced below a top of the aperture.

5. The impact kill animal trap of claim 4, wherein the guide face is closely spaced to the extension, and the guide face holds the trip tray in position on the trip tray pivot.

6. The impact kill animal trap of claim 1, wherein in a set condition of the strike bar, the strike bar distal end is at least one strike bar wire diameter above the cross bar of the strike bar, and the cross bar is rearward of the strike bar distal end.

7. The impact kill animal trap of claim 6, wherein the cross bar is vertically closer to the latch pivot than to the strike bar distal end.

8. The impact kill animal trap of claim 1, wherein when the trap is resting on a horizontal support surface, the strike bar forms an acute angle of less than 80 degrees in relation to the horizontal support surface such that the strike bar distal end is forward of the strike bar pivot axis, the strike bar being normally movable by an applied force at the strike bar distal end through its full possible motion from the tripped position to the bottom set position exclusively by applying a pressing down force toward the ground on the distal end of the strike bar, and wherein the ground exclusively provides a reaction force to the applied pressing down force.

9. The impact kill animal trap of claim 1, wherein a pinch bar is aligned with the side arms of the strike bar in the tripped position of the strike bar, and the pinch bar extends beyond the enclosure a distance of at least ¼ of the distance the strike bar extends beyond the enclosure to provide a bending fulcrum for the strike bar beyond the enclosure.

* * * * *